Dec. 16, 1947. J. P. RASOR 2,432,934
METHOD AND APPARATUS FOR CATALYTIC REACTIONS
Filed Feb. 7, 1944 2 Sheets-Sheet 1

INVENTOR.
J. P. RASOR
BY Philip Subkow
ATTORNEY.

Dec. 16, 1947.  J. P. RASOR  2,432,934
METHOD AND APPARATUS FOR CATALYTIC REACTIONS
Filed Feb. 7, 1944  2 Sheets-Sheet 2
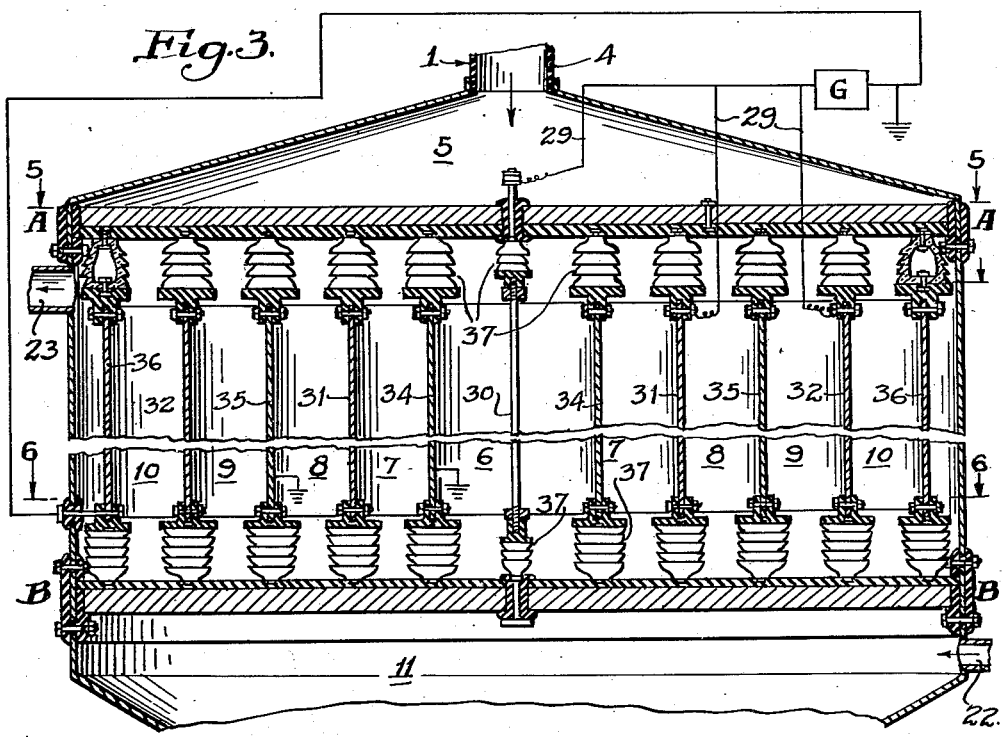
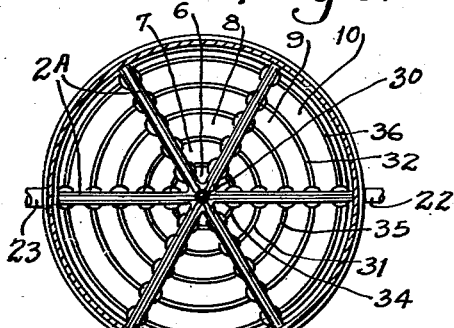
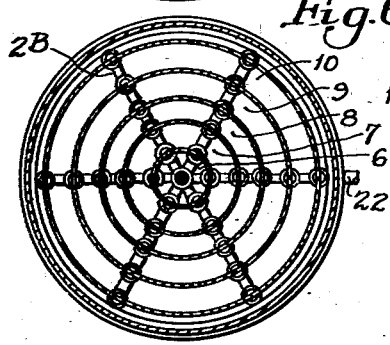
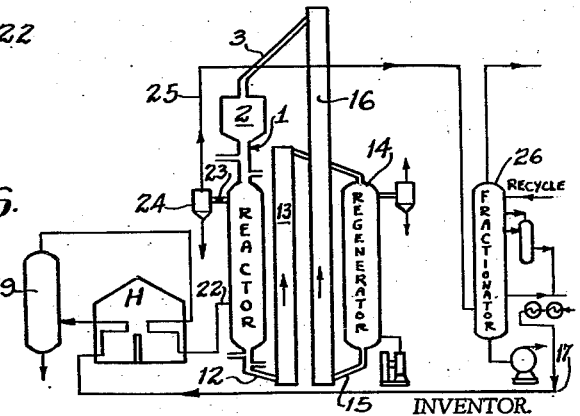
INVENTOR.
J. P. RASOR
BY Philip Subkow
ATTORNEY.

Patented Dec. 16, 1947

2,432,934

UNITED STATES PATENT OFFICE 2,432,934

METHOD AND APPARATUS FOR CATALYTIC REACTIONS

John P. Rasor, San Gabriel, Calif., assignor to Filtrol Corporation, Los Angeles, Calif., a corporation of Delaware Application February 7, 1944, Serial No. 521,453

8 Claims. (Cl. 196—52)

This invention relates to a process and apparatus for catalytic operations at elevated temperature. The rate of reaction and, therefore, the yields and capacities of the process and also the character of the products obtained, are dependent upon the temperature maintained during the reaction.

The loss of heat during such reactions is in part physical, resulting from heat losses due to convection and conduction, and, in part, chemical, where, as in the cracking of petroleum oils, the catalytic reactions are endothermic in nature.

The difficulties of such operation are particularly pronounced where the process is composed of multiple reactions, some concurrent and some sequential, and others of a chain type. Such processes are familiar in cracking of oil. These several reactions all have different temperature coefficients and equilibria and a compromise temperature must be maintained in order to obtain a desired resultant conversion both in amount and type. Variations from this compromise temperature may have large effects on the yield and character of products produced.

In order to overcome this loss of heat and to maintain the reactions at the desired elevated temperature level, the reactants or charging stock entering the catalyst chamber may be superheated and as such reactant passes through the catalyst zone, it suffers a drop in temperature. By elevating the temperature of the entering reactants, the exit temperature from the catalyst zone may be maintained sufficiently high so that the reaction proceedings during the passage of the reactants through the zone of catalysis are above a predetermined minimum.

The difficulty encountered with the use of this means of overcoming the loss of heat arises from the fact that in the main part, or at least in part, the reaction proceeds with gases which are substantially above the desirable temperature level. The reaction proceeds at a falling temperature. This results in lower yields and capacities and may also produce undesirable side reactions or products.

In such process the vapors must be superheated, and in the case of oil cracking, this superheat itself cracks the oil thermally. It is desirable in such processes to suppress the thermal cracking reaction and to amplify the catalytic cracking reaction, since the nature of the products produced is different.

Likewise (as in the case of a continuous catalytic process in which the catalyst enters and moves through a catalytic reaction zone), the catalyst itself may enter the zone of catalysis at a temperature level above the optimum reaction temperature which it is desired to maintain throughout the zone of catalysis. This, also, is but an expedient to provide for the compensation of the above noted loss of heat. In this case also, the temperature levels, during a part or during the main portion of the conversion reaction, will be substantially above a minimum temperature level maintained in the unit. Catalytic conversion operation using this expedient also proceeds at a falling temperature level.

There is, however, a more critical consideration which I believe controls the course of reaction. It is the temperature of the surface of the catalyst which is the locus of the catalytic action. It is the temperature of this locus which determines the rate of reaction. Since, especially in the case of heat loss from an endothermic reaction such as cracking, the negative heat of reaction is concentrated at the catalyst surface, the temperature of the main body of the reactant passing through the catalyst bed between the catalyst grains or pellets may not be, and, moreover, is most likely not to be, at the temperature of the surface of a catalyst. The discharge temperature of the gases or vapors from the catalyst chamber may, indeed, be much greater than the temperature existing at the catalyst surface, since heat transfer, from the gas to the catalyst surface wherein heat is being dispersed by endothermic reaction, may be relatively poor. For this reason, the expedient of superheating the gases may be insufficient to insure the maintenance of the desired temperature level at the surface of the catalytic bodies.

When the catalyst itself enters the reaction zone at a temperature above that at which the reaction is to be carried out, the catalyst surface is, indeed, at the desired level during at least a part of its contact with the reactants. Thus, in a countercurrent system, as in a moving bed catalytic cracking process, the catalyst enters into contact with the vapors near the point of discharge where they are at their lowest temperature and moves into contact with higher temperature vapors. The catalyst drops in temperature and is discharged at or near the temperature of the entering vapors. As the catalyst moves through the reactor it depreciates in catalytic activity due to contamination. Thus, where the catalyst is at its maximum activity, it is at its highest temperature, and when it is at its minimum activity, it is at a lower temperature.

The fact that the temperature which must be controlled during catalysis is that of the surface of the catalyst makes inadequate the use of heating coils or other direct heating units within the catalyst mass. In such methods the catalyst is largely heated either by convection or radiation and the temperatures of the gases in the catalytic bed which are elevated by such heating media may be greater than the catalyst surface to which heat is to be imparted.

The difficulty, just noted, is more apparent when it is remembered that the catalyst surfaces which are the locus of catalytic action reside mainly within the body of the catalyst particle. The catalyst is a highly porous body and the reactant diffuses into and out of the body of the catalyst, for instance. For example, the catalyst may be a porous particle or pellet of about $\frac{1}{16}''$ or less or up to $2''$ in diameter. In such catalytic bodies the physical transfer of heat to or from the gas or vapor to the interior section of such catalyst must be made by the slow process of diffusion of the gases or by the inefficient process of heat conduction through the vapors and mass of the catalyst. The heat conductivity of such catalytic bodies may be low.

These difficulties are particularly apparent in the case of conversion of hydrocarbons, as by the cracking of such hydrocarbons. In such a case, if the hydrocarbons are heated to a temperature of from 850° F. to 950° F., they may suffer a temperature drop of from 25° to 150° F. due mainly to endothermic heat of cracking occurring during passage through the cracking chamber.

The catalyst at the start of the cracking cycle is at the temperature of, or at a temperature somewhat lower than, that attained by the catalyst at the end of the regeneration cycle, but more elevated than the exit temperature of the reactants from the reaction zone. It is likewise true that the temperature of the spent catalyst at the end of the cracking cycle is somewhat lower than the temperature of the vapors entering the reaction zone.

It will be seen, therefore, that the catalyst proper drops in temperature, and also that the vapors themselves drop in temperature, during the course of the catalytic reaction. However, as the reaction proceeds, the vapors are converted into lighter and more refractory products and the catalyst becomes less active as the reaction proceeds due to deposition of coke. For both of these reasons, I believe that the drop in temperature of a catalyst surface is directly opposed to the desirable operating conditions to be maintained. I desire, in the process of my invention, to maintain the temperature of the catalyst surface, and, furthermore, to actually elevate the temperature of a catalytic surface, as the catalyst itself becomes spent or poisoned or as the reactants become more refractory to reaction, as, for instance, cracking.

In my process the reactants enter the catalyst reaction zone at the desired temperature level and come in contact there with a catalyst which is maintained at the desired level. Such a catalytic process may be termed "isothermal." This I accomplish by generating heat within the body of the catalyst. The catalyst surface is thus maintained at the desired temperature level and, therefore, the catalytic reaction temperature is maintained at the desired level independently of the temperature of the reactants or the catalyst at their entrance into the catalyst reaction chamber in a continuous system or of the regenerated catalyst at the start of the cracking cycle in a stationary bed system, and, also, in fact, independently of the temperature of the reactants throughout the reaction. Heat is applied directly at the catalyst surface and not by either conduction, convection, or radiation to, by, or through a gas or vapor, and not by contacting the catalyst with a heating unit such as a heating coil or other similar medium.

I accomplish this means of heat and temperature control by electrically generating heat with the body of the catalyst. This I accomplish by high frequency electric current propagated within a catalytic conversion chamber containing the catalyst.

In my invention the catalyst is maintained or passed between electrodes between which a high potential, high frequency current is passed. Depending on the voltage and frequency employed and upon the power factor of the catalyst material and the reactants and weight of the catalyst and the reactants in the chamber, I obtain a given heat generation within the body of the catalyst and also to some degree within the body of the vapor. By controlling the voltage or the frequency, or both, I can obtain, for any catalyst and catalyst mass and distribution of catalyst in the catalyst chamber, the desired heat generation within the catalyst body. The voltage which may be employed under modern practice in high frequency techniques may practically be below the voltage for corona discharge, or, say, up to 15,000 volts per inch. The frequencies which may be employed will depend on the voltages and the load, and may vary from 1 to 25 megacycles. The higher range of frequencies, known as radio frequencies, are more desirable, since they require the lowest potential gradients. This form of heat input may be termed, generally, high frequency or electronic heating, and when employing radio frequencies it may be termed radio frequency or radionic heating.

Since the heat thus generated is created uniformly throughout the whole mass of the catalyst, the heat is also generated at the catalyst surfaces wherein the endothermic reactions occur. The energy input occurs at the locus of the reaction.

The catalyst is a highly porous material with an exceedingly high surface-to-volume ratio. The linear distances between opposed or adjacent surfaces are far less than in ordinary dense solids of similar external dimensions. Consequently, when employing electronic heating, any heat loss due to endothermic reactions at the surface sets up little or no temperature gradients across the mass of the catalyst. The heat is abstracted substantially uniformly from the catalyst mass. The heat input attained by the employment of electronic heating wipes out these temperature differences. The result of this compensating action is that the temperature of the catalyst mass, together with the temperature of the catalyst surface are maintained at desired temperatures, and, furthermore, this temperature may be maintained both constant and uniformly throughout the catalyst mass by the control of the high frequency electric field employed in heating the catalyst. The catalyst is thus under isothermal conditions throughout the reaction.

As a catalyst becomes spent, its catalytic activity diminishes. This catalytic activity may be again elevated by raising the temperature of the catalyst surface. By my invention this may be accomplished readily by adjustment of the voltage or frequency. This method is particularly adapted to stationary bed catalytic processes.

In like manner, as the reaction progresses, and, optionally, as the reactants pass from one zone of catalysis to another zone in a continuous system such as a moving bed system, the catalyst with which the reactants come in contact may either be at a diminished or more elevated temperature. Here again, the energy input to a catalyst and, therefore, the temperature of a catalyst body at the catalytic surface, may be controlled for the purposes indicated by the control of the voltage or frequency applied separately in the several zones through independent electrode systems.

By the application of high frequency electronic heating, I may adjust the temperature of a catalyst mass, and particularly that of the catalyst surface, and I may vary that temperature in a highly effective manner. Unlike the methods of heating whereby the heat must come from an exterior source into the catalyst body, the temperature of a catalyst mass may be the same as that of the surface, and the temperature of the catalyst mass may be equal to or even greater than the temperature of the gaseous reactants or the space surrounding the solid catalyst particles. Furthermore, any desired change in catalyst temperature can be obtained in this manner both more quickly and with greater uniformity than by present practices. The temperature of the catalyst surface may be accurately adjusted and maintained at the most desired temperature, and control is maintained of the rate of any desired temperature increase or decrease.

If it is desired to elevate the temperature of reaction, the electronic heating is increased to raise the catalyst surface to the desired elevated temperature and again the electronic heating is adjusted to the desired elevated temperature again compensating for endothermic or other heat losses.

If it is desired to cause the temperature of the catalyst surface to elevate at a given rate, the voltage or frequency employed in electronic heating is adjusted to obtain this temperature elevation at the desired rate.

In like manner the temperature of a catalyst surface may be diminished to a constant diminished temperature level or diminished at a desired rate by the control of the voltage and frequency.

Since the limiting conditions of heating by high frequency heating is flash-over between the electrodes, the process is best adapted when the potential employed in the electronic heating is less than the break-down potential of the gases or liquids employed under the conditions of the catalysis.

In the case of vapors of high dielectric value, the high frequency current passing through the vapors will also heat them to a certain extent and this will aid in compensating for the heat losses discussed above.

Because of the high dielectric constant of hydrocarbon materials and of the catalysts employed on such processes, the high frequency electric field heating process is particularly adaptable to catalytic reactions employing such material. Among the endothermic reactions involving such hydrocarbon material are cracking and dehydrogenation. Many reactions occur at high temperature in which the heat of reaction is of small importance in comparison to the other heat losses occurring in the process. In such case, also, high frequency or electronic heating is of importance in the maintenance of the catalytic surface at the desired level or levels.

The process, therefore, in which my invention finds particular utility includes cracking and other processes of conversion of carbon-to-carbon bonds, dehydrogenation, destructive dehydrogenation, cyclization, isomerization of hydrocarbons, alkylation, dehydration by removal of HOH from the molecules of oxygenated organic compounds, and other high temperature catalytic reactions involving reacting vapors, gases, or liquids and catalysts of high dielectric constants.

It is therefore an object of my invention to carry out catalytic process such that the liquids, vapors, or gases entering the catalytic chamber need to be heated below or only at the temperature of the reaction.

It is a further object of my invention to maintain the temperature of a catalyst surface independently of the temperature of the reactants in the reaction zone.

It is a further object of my invention to maintain the catalyst under isothermal conditions during the course of the reaction.

It is a further object of my invention to compensate for heat losses and particularly for the heat absorbed by endothermic reaction by supplying heat to the catalyst surface.

It is a further object of my invention to employ electronic heating to supply this endothermic heat loss or other heat losses.

It is a further object of my invention to maintain the temperature at the catalyst surface substantially or exactly constant or isothermal during the entire catalytic cycle by employing electronic heating.

The objects named in the foregoing, and the principles of my invention which I have outlined, are further defined in the accompanying diagrammatic figures which illustrate the embodiment of my discovery and which will be described. In the drawings:

Fig. 3 is a fragmentary detailed sectional view of the catalytic reactor;

Fig. 4 is a diagrammatic representation of the flow for the catalytic conversion of hydrocarbons and which embodies the reactor shown in Figs. 1 and 3;

Fig. 5 is a section taken on the line 5—5 of Fig. 3; and

Fig. 6 is a section taken on the line 6—6 of Fig. 3.

Figure 1:
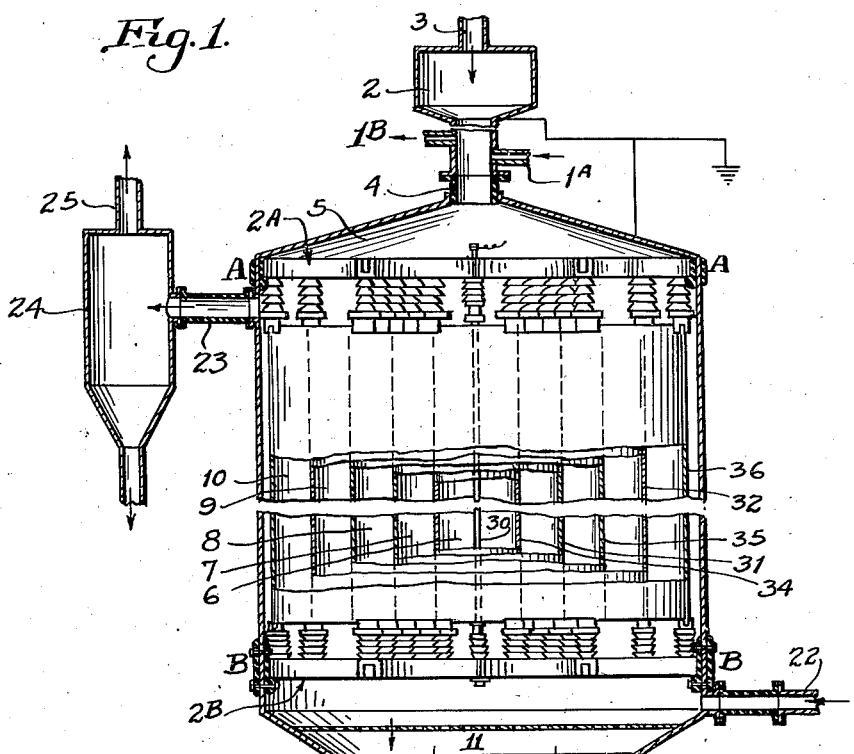
Fig. 1 is a fragmentary sectional view of the catalytic conversion unit or reactor.

Referring to Figs. 1, 3, and 4, a catalytic material which will be described hereinafter is fed into the reactor at a controlled rate through leg 1 from supply hopper 2 which is fed through a chute 3. Leg 1 may be equipped with an insulating section 4 so as to prevent the passage of electric current into hopper 2. Steam or inlet gas is introduced into leg 1 through 1A and discharged through 1B. The steam or gas, being at a pressure higher than that of the reactor, provides a seal against the entry or passage of lower pressure reactants through leg 1.

The surge space 5 is provided for the catalytic material which is fed continuously into the catalytic conversion section of the reactor. The reactor is constructed, as a single illustration of my invention, of five concentric cylindrical shells mounted equidistant from each other and from the central electrode. These shells are 34, 31, 35, 32, and 36, as they extend successively outwardly from the center of the reactor and they enclose respectively catalytic conversion zones 6, 7, 8, 9, and 10. These cylindrical shells also serve as passageways providing for the uniform gravity movement of the catalytic material through and out of the conversion zones whence they discharge into chamber 11 from which the catalytic material emerges through leg 12.

Leg 12 may be provided with an insulating section 4 which prevents the passage through 12 of any electrical current from the reactor and it is also equipped with a pressure seal 12A, 12B, similar to 1A, 1B, which prevents by pressure difference the passage of reactant gases from the reactor. The steam or gas in seal 12A, 12B purges the emerging catalytic material of any content of vapors passing with the catalyst from the reactor.

Figure 2:
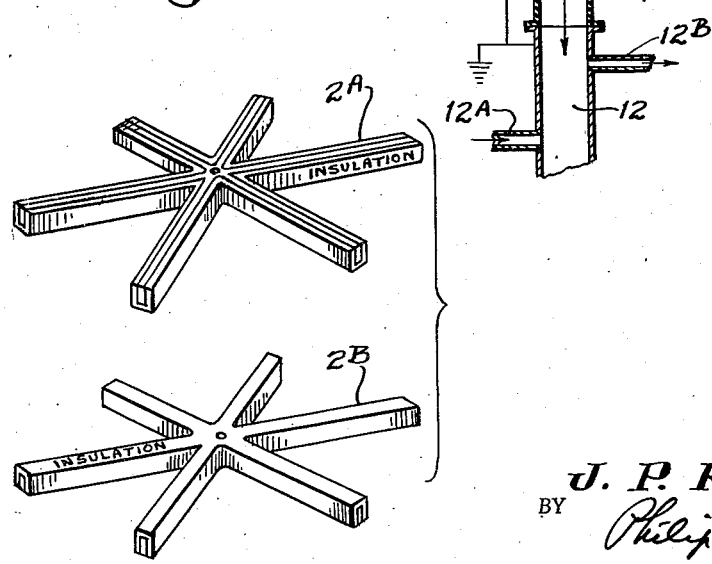
Fig. 2 is a detail of both the upper (2A) and the lower (2B) structural rib members.

The five shells previously mentioned are supported structurally on insulating supports 37 mounted on the insulated spider 2B in Fig. 2. Spider 2A is structurally and otherwise generally similar to 2B, but is mounted in the upper section of the reactor, and also serves as a bracing or supporting structure for the zone shells which are also secured to it by similar insulation units 37. Mounted centrally within space 6 is an electrode 30 suitably mounted and insulated by insulators 37. G represents diagrammatically a source of high frequency current. 29 represents the lead-in connections to the reactor for the high frequency current. One of the lead-in connections 29 is secured to the center electrode 30, a second lead-in connection to the concentric shell 31, and a third lead-in connection from G is secured to shell 32. These units are therefore mounted in parallel. As previously mentioned, there are provided three additional concentric cylindrical shells 34, 35, and 36. These shells serve as the grounded electrodes. These three shells are connected to the shell of the reactor and to ground. The reactor shell and the entire catalytic unit are suitably grounded.

As a result of this condition there is provided a plurality of live electrodes 30, 31, and 32 carried at the potential of the electrical source. Shell 35 is placed equidistant between 31 and 33, and the distance between 32 and 36 and between 34 and 30 equals that between 31 and 34 or 35. In such manner a uniform potential gradient occurs in all of the zones.

Referring to Fig. 4, the catalytic material employed in this invention is charged initially into the system at the bottom of bucket elevator 16 whence it is lifted for discharge into diagonal feed line 3 and into catalyst hopper 2, thence being discharged through feed leg 1. The catalyst is dispersed evenly by spaced dispersal baffles into the circular area of 5 through which it descends uniformly into catalytic zones 6, 7, 8, 9, and 10 of Fig. 1, and thence into the reactor discharge zone or space 11 of Fig. 1. Subsequent flow of a catalyst material through feed leg 1 occurs until the reactor zones and space 11 are completely filled and to a level substantially above the upper plane of the zone shells 34, 31, 35, 32, and 36. Space 11 is provided with perforated baffles so perforated as to insure uniform motion of the catalyst through the unit.

The rate of the downward passage of the catalytic material through the conversion zones and through discharge space 11 of the reactor is controlled by the rate of removal of catalyst from the unit and which withdrawal rate is in turn controlled by means of a conveyor unit installed between the bottom of leg 12 and bucket elevator 13.

The catalyst is thus distributed to pass uniformly and equally through the reaction zones 6, 7, 8, 9, and 10. Due to the limited width of the annuli, this permits of a uniform contact of the reacting vapors with the catalyst and avoids channelling. The out-flow of spent catalytic material from the reactor passing through line 12 is conveyed to the chain driven buckets in elevator 13 whence it passes through a conveyor into the regeneration unit 14. The regenerated catalyst passes out of the regeneration zone through line 15 to elevator 14 whence it is routed through line 3 to the reactor hopper 2, thus completing its cycle of movement.

The invention will be more clearly understood from the following description of a preferred process employing the above reactor. It should be understood that the accompanying drawings or description are for the purpose of illustrating my invention and describing a preferred embodiment thereof and should not be construed as limiting my invention.

Any type of naphtha or gas-oil charging stock which may be cracked, such as either napthenic or paraffinic, or a mixed base gas-oil, may be fed to the reactor. For instance, a reduced crude may be fed into line 17 and after passing through one or more heat exchange units it is then passed through one portion of a tubular heating coil H in which the charging stock would be elevated to a temperature sufficient to cause vaporization of the gas-oil of desired boiling range. The unvaporized residuals are separated in separator 19. The charge vapors emerging from a tar separator are then returned to heater H and are discharged therefrom at the desired outlet temperature which may range from approximately 750° F. to 1050° F. On high boiling, non-refractory paraffinic stocks the temperature of emerging stock from the heaters might be as low as 725° F. and range up to about 1050 F. With the lower boiling, more refractory type of cracking stocks, the heater outlet may be in the order of around 850° F. to 1050 F. Again this temperature will depend on the depth of cracking and the octane value of the gasoline desired.

The vapors pass from the heater through line 22 to the catalytic conversion unit or reactor shown in Figs. 1 and 3. The vapors enter the enlarged space 11 of the reactor which is full of catalytic material and pass upwardly in each of the zones 6, 7, 8, 9, and 10 of the conversion unit to the upper section 5 of the conversion unit and from this upper section the catalytically converted vapors are then discharged through line 23 which may be provided on insulating section 4 into cyclone or electrical separator 25. Dust is removed from the bottom 24 and the vapors then pass to conventional fractionation through line 25 in fractionating column 26 into separate gasoline and unconverted recycle stock.

As a single example, gas-oil would be charged to heater H and the heated vapors from H would be routed to the reactor at a transfer temperature of from 875° F. to 950° F. I control the voltage and frequency of current entering electrode 30 and platens 31 and 32 so that when the charge of such vapor to the reactor had passed upwardly through the catalytic conversion zones 6, 7, 8, 9, and 10, such vapors would discharge from the reactor at outlet 24 at approximately the same temperature as was the inlet temperature of such vapors to the reactor, for example, in the range of from 875° F. to 950° F. The reaction thus proceeds under isothermal conditions in contact with catalyst maintained at the chosen temperature level.

As an example of a reaction proceeding through a rising temperature gradient, the reforming of a naphtha or a light gas-oil may be cited. Thus, the vapors may enter the reactor at from 950° F. to 1000° F. and may be discharged from the reactor at from 50° F. to 100° F. higher temperature than the temperature existing at the inlet to the reactor. In order to accomplish this operation I construct the reactor with a plurality of nested sections in series. The nests are insulated from each other and connected to voltage sources at different voltages and frequencies. In this way the reaction rate, which otherwise falls off as cracking reaction proceeds, is not only maintained but is actually accelerated by the increase in temperature of the reacting components as induced by high frequency electrical heating.

My choice of catalytic materials is large, but preferably limited to materials of high dielectric constants, i. e., of low conductivity, and may consist of either virgin, synthetic, or artificially activated materials such as alumina, bauxite, magnesite, bentonite, sub-bentonite, etc., or may be some one or more of these or similar substances either by themselves or their compounds. In addition there may be used in this invention any one or more of these materials subsequent to their being impregnated or mixed or having deposited upon them various other types of promoter catalysts, such as tungsten, vanadium, zinc, aluminum, chromium, molybdenum, titanium, etc., or their hydroxides or oxides, salts or other forms of admixtures of these or similar materials. I may employ these oxides as mixed gels, as, for instance, a silica-alumina gel or silica-magnesia gel.

I also prefer to use a catalytic material in particle size of from 4 to 10 mesh or in pellet form, i. e., about $1/16''$ to $3/16''$ diameter and higher, but my invention is equally adapted to the use of catalytic reagents in either larger or smaller particle sizes including pelleted catalyst.

While I have illustrated my invention as specifically applied to a moving bed process, it may also be applied to a stationary bed unit, in which case the reactor of the stationary bed unit is provided with the nested electrodes. It may also be applied to a "fluid catalysis" process, in which case the nested electrodes are placed in the reactor in which the fluid body of granular catalyst and reacting vapors are introduced for reaction and separation.

While I have described a particular embodiment of my invention for the purpose of illustration, it should be understood that various modifications and adaptations thereof may be made within the spirit of the invention as set forth in the appended claims.

I claim:

1. An enclosed catalytic reactor, comprising a shell, electrodes in said shell insulated from each other, means for introducing discrete solid catalyst particles between said electrodes, means for passing vapors to be catalytically reacted into said shell and in contact with said catalyst in said shell, separate means for withdrawing said vapors from contact with said catalyst and from said shell, and means for passing a high frequency heating current through said catalyst between said electrodes.

2. An enclosed catalytic reactor, comprising a shell, a plurality of concentric spaced electrodes in said shell, means for passing catalyst into said shell between said electrodes and out of said shell, means for passing vapors into said shell and into contact with said catalyst, separate means for withdrawing said vapors from said shell, and means for passing a high frequency heating current through said catalyst and between said electrodes.

3. A method for catalytic cracking of hydrocarbon vapors, which comprises establishing a body of discrete cracking catalyst particles of high dielectric value at an elevated temperature between spaced electrodes, passing hydrocarbon vapors at an elevated temperature through said body to crack said hydrocarbons under conditions whereby said body is subject to heat loss, imposing a high frequency potential between said electrodes, said potential being below the breakdown potential of said vapors, and thereby electrically generating heat uniformly in said vapors and in said particles throughout said body to compensate for said heat loss and to maintain the temperature of the particles throughout said body of catalyst particles substantially uniform, elevating the temperature of said particles by adjusting the high frequency current to increase the temperature of said catalyst body and maintain said mass at said more elevated temperature, and passing hydrocarbon vapors undergoing catalytic cracking through said last-named body.

4. A method for catalytically cracking hydrocarbons, which comprises establishing a body of discrete cracking catalyst particles of high dielectric value between spaced electrodes insulated from each other, passing hydrocarbons of high dielectric constant through said catalyst body, applying a high frequency potential between said electrodes, said potential being below the breakdown potential of said hydrocarbons and below the potential for corona discharge, and thereby electrically generating heat uniformly throughout said hydrocarbons and the body of said catalyst to maintain said particles of said body at a predetermined and uniform temperature during the passage of said hydrocarbons through said body to cause said cracking to proceed under isothermal cracking conditions throughout said catalyst body.

5. A process for catalytic reaction, which comprises passing a stream of solid catalyst particles of high dielectric constant between spaced electrodes through a high frequency electric field of high potential, maintained between said electrodes, and passing reactant vapors through said field in contact with the catalyst particles in said field.

6. A process for catalytic conversion of hydrocarbons, which comprises passing a stream of solid catalyst in contact with a reacting hydrocarbon vapor between spaced electrodes, and passing a high frequency current between said electrodes through said catalyst particles during its passage.

7. A process for catalytic conversion of hydrocarbon, which comprises passing a body of solid catalyst particles of high dielectric constant between spaced electrodes in contact with a reacting hydrocarbon vapor, and passing a high frequency current between said electrodes through said catalyst particles during their passage to maintain said catalyst particles at approximately a constant temperature during said contact.

8. In a process of catalytically cracking fluid hydrocarbon reactant with a cracking catalyst in which the fluid hydrocarbon reactant is in contact with the catalyst at elevated temperature and the mixture of catalyst and reactant has a high dielectric constant, the improvement which comprises subjecting such mixture of catalyst and fluid hydrocarbon reactant to dielectric heating at high frequency and at a voltage below the breakdown potential of the reactants and below the voltage for corona discharge.

JOHN P. RASOR.

REFERENCES CITED

The following references are of record in the file of this patent:

UNITED STATES PATENTS

| Number | Name | Date |
|---|---|---|
| 1,407,340 | Van Steenbergh | Feb. 21, 1922 |
| 1,597,476 | Page | Aug. 24, 1926 |
| 1,709,813 | Henry | Apr. 16, 1929 |
| 1,930,169 | Halvorson et al. | Oct. 10, 1933 |
| 1,956,573 | Haslam | May 1, 1934 |
| 1,957,254 | Eymann | May 1, 1934 |
| 1,972,050 | Davis | Aug. 28, 1934 |
| 1,986,348 | Lacy et al. | Jan. 1, 1935 |
| 2,030,198 | Cerf | Feb. 11, 1936 |
| 2,257,177 | Luster | Sept. 30, 1941 |
| 2,274,988 | Matuszak | Mar. 3, 1942 |
| 2,320,318 | Simpson et al. I | May 25, 1943 |
| 2,331,433 | Simpson et al. II | Oct. 12, 1943 |
| 2,340,878 | Holt et al. | Feb. 8, 1944 |

FOREIGN PATENTS

| Number | Country | Date |
|---|---|---|
| 561,048 | Germany | Oct. 10, 1932 |